(12) United States Patent
Kurtz et al.

(10) Patent No.: US 12,326,601 B2
(45) Date of Patent: Jun. 10, 2025

(54) ALIGNMENT STRUCTURE FOR A FIBER OPTIC FERRULE AND MECHANICAL-OPTICAL INTERFACE

(71) Applicant: US Conec Ltd., Hickory, NC (US)

(72) Inventors: Daniel D. Kurtz, Huntersville, NC (US); Darrell R. Childers, Hickory, NC (US); Brent D. Henley, Newton, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 18/481,919

(22) Filed: Oct. 5, 2023

(65) Prior Publication Data

US 2024/0036275 A1 Feb. 1, 2024

Related U.S. Application Data

(63) Continuation of application No. 17/046,956, filed as application No. PCT/US2019/026938 on Apr. 11, 2019, now Pat. No. 11,953,739.

(60) Provisional application No. 62/656,894, filed on Apr. 12, 2018.

(51) Int. Cl.
*G02B 6/42* (2006.01)
*G02B 6/38* (2006.01)

(52) U.S. Cl.
CPC .......... *G02B 6/423* (2013.01); *G02B 6/3825* (2013.01); *G02B 6/3839* (2013.01); *G02B 6/3853* (2013.01); *G02B 6/3881* (2013.01); *G02B 6/4292* (2013.01)

(58) Field of Classification Search
CPC ........ G02B 6/42; G02B 6/423; G02B 6/4292; G02B 6/38; G02B 6/3825; G02B 6/3839; G02B 6/3853; G02B 6/3881
See application file for complete search history.

(56) References Cited

U.S. PATENT DOCUMENTS

| | | | |
|---|---|---|---|
| 5,241,612 A | 8/1993 | Iwama | |
| 6,769,811 B2 * | 8/2004 | Hall | G02B 6/3882 385/59 |
| 8,961,042 B2 | 2/2015 | Sun et al. | |
| 8,985,865 B2 | 3/2015 | Howard et al. | |
| 9,618,711 B2 | 4/2017 | Kurtz et al. | |
| 9,651,749 B1 | 5/2017 | Steijer et al. | |
| 9,983,365 B2 | 5/2018 | Childers | |
| 11,953,739 B2 * | 4/2024 | Kurtz | G02B 6/3881 |
| 2007/0098328 A1 | 5/2007 | Dean, Jr. et al. | |
| 2009/0097801 A1 | 4/2009 | Nishimura et al. | |
| 2011/0103747 A1 | 5/2011 | Chang et al. | |
| 2014/0112622 A1 | 4/2014 | Lin | |
| 2014/0314377 A1 | 10/2014 | Huang | |

(Continued)

OTHER PUBLICATIONS

Extended European Search Report; dated Dec. 2, 2021; 10 pages; references previously cited.

(Continued)

*Primary Examiner* — Tina Wong (74) *Attorney, Agent, or Firm* — Michael L Leetzow PLLC; Shubhrangshu Sengupta (57) ABSTRACT

A new fiber optic ferrule has an alignment structure on a surface through which light passes. The alignment structure is preferably in the shape of a dog bone, allowing the alignment structure to align the fiber optic ferrule in a receptacle while reducing the influence of temperature on the alignment.

20 Claims, 11 Drawing Sheets

(56) References Cited

U.S. PATENT DOCUMENTS

2015/0301285 A1   10/2015  Lewallen et al.
2016/0252687 A1*  9/2016  Badihi .................. G02B 6/423
                                                      385/14
2017/0184800 A1    6/2017  de Jong et al.

OTHER PUBLICATIONS

International Search Report and Written Opinion of the ISA in PCT/US2019/026938, Date of Mailing Jul. 1, 2019.

* cited by examiner

ALIGNMENT STRUCTURE FOR A FIBER OPTIC FERRULE AND MECHANICAL-OPTICAL INTERFACE

BACKGROUND OF THE INVENTION

This application claims priority under 35 U.S.C. § 119 (e) to U.S. Provisional Patent Application Ser. No. 62/656,894, filed on Apr. 12, 2018, and under 35 U.S.C. § 120 to U.S. patent application Ser. No. 17/046,956, filed on Oct. 12, 2020, the contents of which are incorporated by reference.

FIELD OF THE INVENTION

Photonic-enabled transceiver devices typically are optically coupled to optical fibers by a fiber optic ferrule in which the optical fibers are secured. The fiber optic ferrule may have internal optical structures (e.g., lenses) that may be used to shape and/or direct the light beams between the transceiver and the optical fibers. The fiber optic ferrule maybe coupled to a mechanical—optical interface (MOI) or other receptacle that may also have internal optical structures. In some instances, the other receptacle might be an adapter that is used to optically couple to fiber optic ferrules.

The transceiver devices and the fiber optic ferrules are typically aligned with one another to ensure proper transmission of the light between the components. The receptacle and the transceiver devices are usually aligned by active alignment. Once the receptacle and the transceiver device are aligned, then the fiber optic ferrule can be aligned with the receptacle and/or transceiver device. However, the devices are typically made from different materials, which have different coefficients of thermal expansion (CTE), and the different CTEs may affect the alignment of the various components. In general, a change in ambient temperature ($\Delta T$) causes a change in a dimension ($\Delta D$) of the material of the optical ferrule and/or lenses (expansion or contraction). These variables are related as: $\Delta D = D \times (\Delta T) \times CTE$, where D is a distance between the two CTE mismatched materials (e.g., lenses etched in Si and the alignment features made of ferrule plastic material). In the prior ferrules, this distance would correspond to the distance between guide pins used to align the fiber optic ferrules and the location of the light exiting/entering the fiber optic ferrule. In order to reduce the change in the dimensions (and thus the alignment), it would be better to have the alignment feature closer to the location of where the light exits/enters the fiber optic ferrule.

A fiber optic ferrule has been invented that reduces the distance between the alignment features and the exit/entry location of the light. The materials used to align the components have also been changed to materials with a similar CTE, reducing yet another variable in the equation.

SUMMARY OF THE INVENTION

The present invention is directed to a fiber optic ferrule that includes a main body having a plurality of optical fiber openings therein, each of the plurality of optical fiber openings configured to receive an optical fiber therein, a surface on the main body in optical alignment with the plurality of optical fiber openings, and an alignment structure extending from the surface outward away from the main body, the alignment structure having a first portion extending between two second portions along the surface, the second portions being on opposite sides of the first portion.

In some embodiments, the fiber optic ferrule includes a light transmission window through which light passes, the light transmission window being disposed within the first portion of the alignment structure.

In some embodiments, the surface lies in a plane that is generally parallel to a longitudinal axis through the plurality of optical fiber openings.

In some embodiments, the surface lies in a plane that is generally perpendicular to a longitudinal axis through the plurality of optical fiber openings.

In another aspect, the invention is directed to a combination of a fiber optic ferrule and an optical component that includes a fiber optic ferrule that includes a main body having a plurality of optical fiber openings therein, each of the plurality of optical fiber openings configured to receive an optical fiber therein, a surface on the main body in optical alignment with the plurality of optical fiber openings, and a first alignment structure having a first portion extending between two second portions, the second portions being on opposite sides of the first portion, and the optical component has an engagement surface to engage a portion of the surface of the main body and a second alignment structure having a center portion extending between two outside portions, the outside portions being on opposite sides of the center portion, wherein one of the first and second alignment structures extend outward and the other of the first and second alignment structures extend inwardly.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiment(s) of the invention, examples of which are illustrated in the accompanying drawings. Whenever possible, the same reference numerals will be used throughout the drawings to refer to the same or like parts.

One embodiment of a fiber optic ferrule 100 according to the present invention is illustrated in FIGS. 1-4. The fiber optic ferrule 100 has a main body 102 that extends between a front end 104 and a rear end 106. A plurality of optical fibers 108 can be secured within the fiber optic ferrule 100. The optical fibers 108 are inserted into the fiber optic ferrule 100 through a rear opening 110 through the rear end 106. Each of the plurality of optical fibers 108 is inserted into one of a plurality of optical fiber openings 112 in a center portion of the main body 102. The fiber optic ferrule 100 is a total internal reflection fiber optic ferrule meaning that the light to and from the optical fibers 108 encounters lenses 114 towards the front end 104 and passes through ferrule 100 through a bottom surface 116. It will be understood by one of ordinary skill in the art in view of this patent application that instead of a single row of optical fibers 108, two or more rows of optical fibers, or other arrangement of optical fibers 108 (instead of a row), may be used without departing from the scope of the present patent application.

With regard to the embodiment in FIGS. 1-4, Applicant notes that the term "front" or "forward" means that direction where the optical fibers are terminated, while the term "rear" or "rearward" is used to mean the direction from which the optical fibers enter into the fiber-optic ferrule or fiber optic connector. Thus, "front" is that part of the fiber optic ferrule 100 on the left side of FIG. 1 (see arrow) and "forward" is out and to the left. "Rear" is that part of the fiber optic ferrule that is on the right side of the page and "rearward" is toward the right.

The fiber optic ferrule 100 has two openings in a top surface 118 for an adhesive/epoxy to hold the plurality of optical fibers 108 within the fiber optic ferrule 100. The first opening 120 is between the plurality of optical fiber openings 112 and the rear end 106. The second opening 122 is between the plurality of optical fiber openings 112 and the front end 104. The second opening 122 is usually in communication with the ends of each of the plurality of optical fibers 108, but the plurality of optical fibers 108 may end before the second opening or even extend beyond the second opening 122. See, e.g., U.S. Pat. Nos. 8,985,865; 9,618,771; and 9,983,365, owned by the same applicant as the present invention. However, the ferrule 100 need not have either or both of the openings 120, 122 and may simply have only the opening at the rear end 106.

There may also be another opening or cavity in the main body 102 of the fiber optic ferrule 100—lens opening 124. This lens opening 124 has the plurality of lenses 114, see FIG. 4, that may be exposed to air or covered with an anti-reflection coating, causing them to be total internal reflective lenses. As such, the light passing through the fiber optic ferrule 100 is turned 90 degrees within the fiber optic ferrule 100 by the plurality of lenses 114. The plurality of lenses 114 may also condition the light in other ways, e.g., collimating the light, expanding or reducing the size of the light beam, etc.

On the bottom surface 116 is an alignment structure 130. It is noted that the bottom surface 116 is also the surface through which the light passes to and from the plurality of optical fibers 108. The alignment structure 130 extends from the bottom surface 116 and away from the main body 102. In the middle 132 of the alignment structure is a light transmission window 134 that is in optical alignment with the plurality of lenses 114 and the plurality of optical fibers 108. The light could from a photonic integrated circuit (PIC), a VCSEL, or from any another light source. Alternatively, light output from or input into the optical fibers may pass through lenses in another aperture in the MOI onto a photodetector or PIC of the transceiver below the lens array of the MOI. See FIGS. 4 and 5 and the related discussion below. It will be appreciated by one of ordinary skill in the art reading this patent application that while the term "transmission" is being used for transmission window 134, the discussion is equally applicable to reception of optical beams passing therethough.

The alignment structure 130 is configured similar to the shape of a dog bone, the reasons for which will be discussed below. However, it should be noted that other configurations are possible. See, e.g., FIG. 13. The alignment structure 130 has a first portion 136 extending between two second portions 138, 140 along the bottom surface 116. As illustrated, the first portion 136 is generally rectangularly shaped, but could have other configurations as long as the functions of the alignment structure 130 as noted below are satisfied. For example, the first portion 136 could have convex or concave sides rather than the straight ones. The two second portions 138, 140 are illustrated as circular portions that connect with the first portion 136 at the ends thereof. The first portion 136 is preferably as long as the transmission window 134 to allow the light to pass therethrough, but it could be longer or shorter. The transmission window 134 can be longer than the first portion 136 so that the transmission window 134 extends into the second portions 138, 140. See, e.g., FIG. 3. If the transmission window 134 is shorter than the first portion 136, then the second portions 138, 140 are closer to edges of the fiber optic ferrule 100. In a variation of the alignment structure 130, there may be more than one of each of the second portions 138, 140, without departing from the scope of this patent application. For example, on each side of the first portion 136, there may be two circular portions that connect with the first portion 136 at the ends thereof.

The second portions 138, 140 are generally circular as illustrated in the figures. The second portions 138, 140 have a diameter that is about 0.766 mm, and the first portion 136 has a width of about 0.516 mm. Thus, the diameter of the second portions 138, 140 is about 50% larger than the width of the first portion 136. It is preferred that the diameter of the second portions 138, 140 is at least 30% larger than the width of the first portion 136. It is generally more preferable that the diameter of the second portions 138, 140 is at least 50% larger than the width of the first portion 136. It should also be noted that the second portions 138, 140 may also have other configurations as long as the functions of the alignment structure 130 as noted below are satisfied. For example, the second portions 138, 140 could be more oval, tear-drop shaped, or two rounded portions separated by a straight portion and still fall within the scope of the present invention. The first portion 136 may also have other features including, for example, a reduced width at the junction with the second portions 138, 140 so the second portions 138, 140 have more of a curved outer edge.

Figure 1:
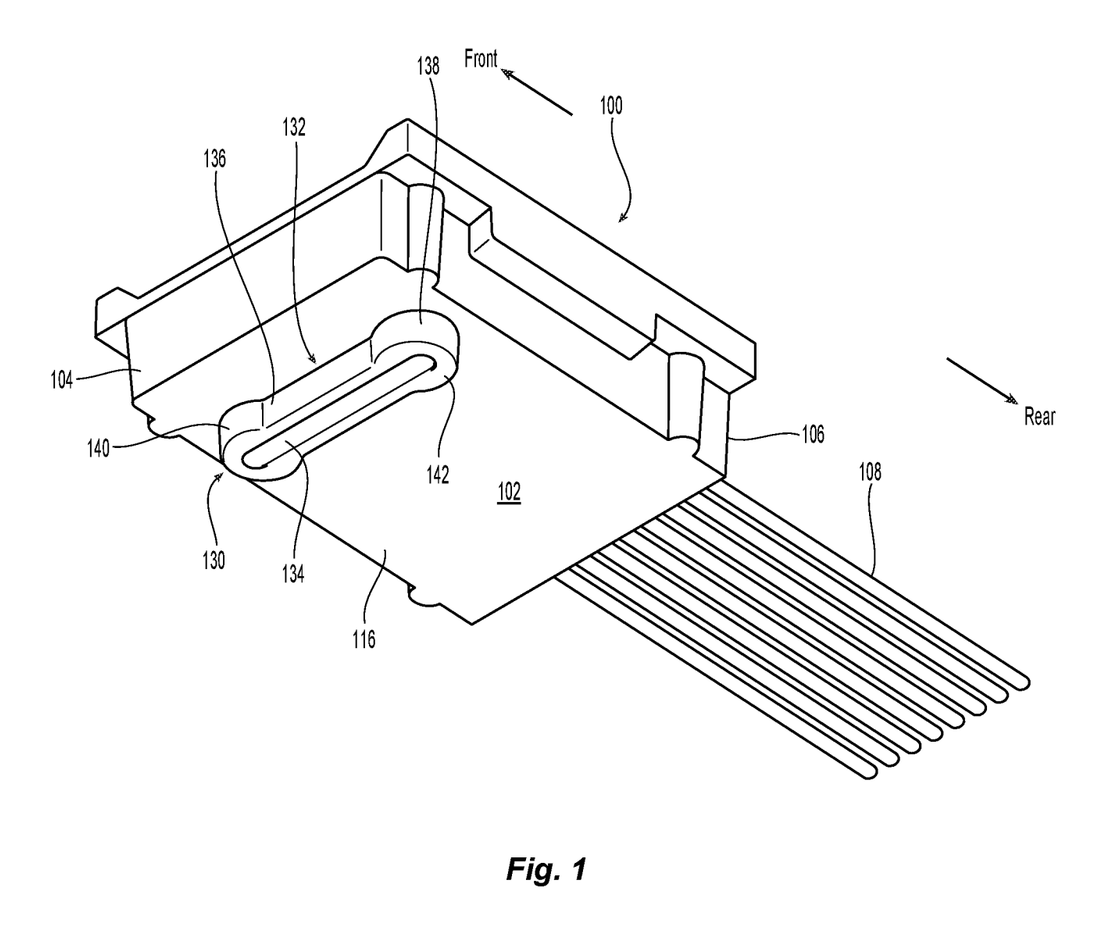
FIG. 1 is a perspective view of one embodiment of a fiber optic ferrule from the bottom according to the present invention.
Figure 2:
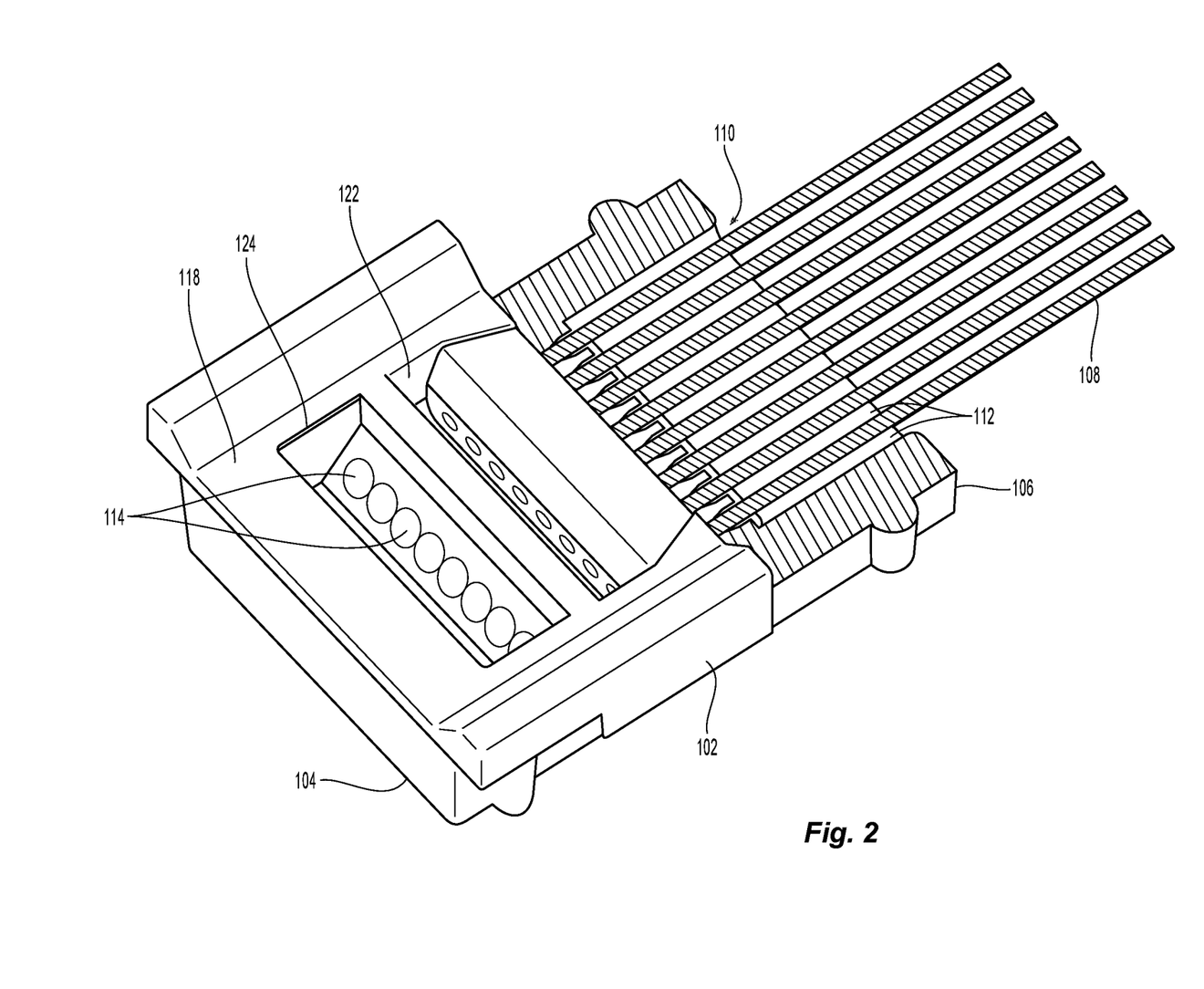
FIG. 2 is a perspective view from the top of the fiber optic ferrule in FIG. 1.
Figure 2A:
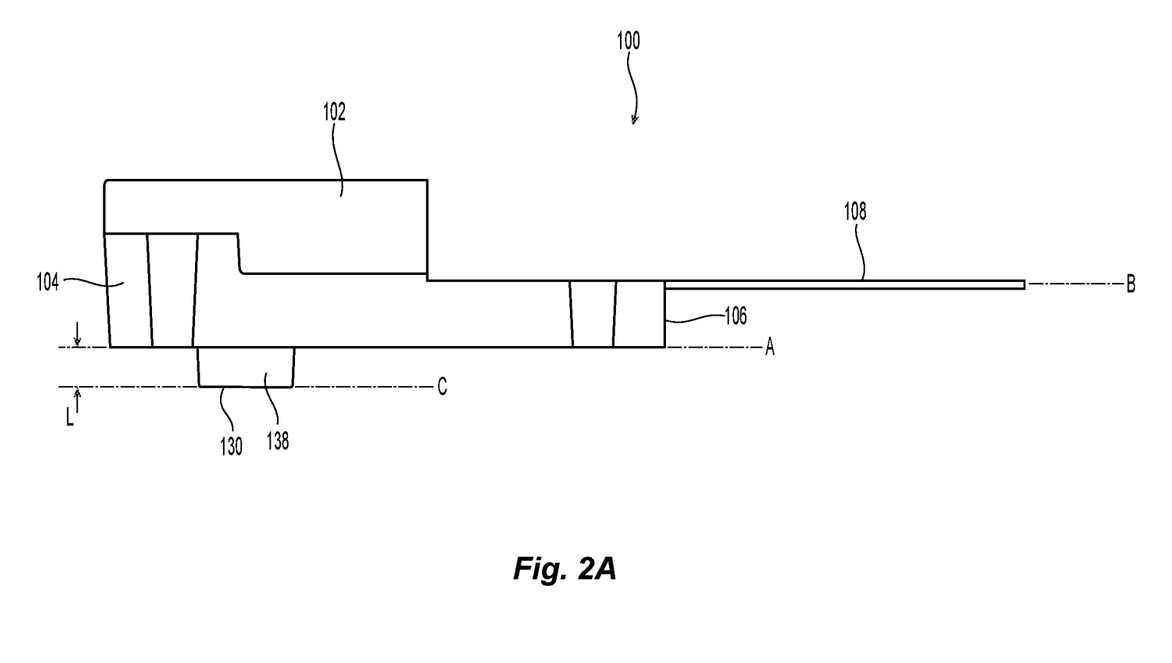
FIG. 2A is side elevational view of the fiber optic ferrule in FIG. 2.

The bottom surface 116 lies in a first plane A, which is generally parallel to a plane B (and a longitudinal axis) in which the plurality of optical fibers 108 (and the plurality of optical fiber openings 112) lie. However, it is possible that the planes A and B are not parallel to one another as illustrated in U.S. Pat. No. 8,985,865. The alignment structure 130 has a front face 142 that lies in a plane C that is also preferably parallel to planes A and B. See FIG. 2A.

The alignment structure 130 extends a distance L of about 0.3 mm from the bottom surface 116 and away from the main body 102. However, the distance that could be greater or less, depending on the need of the user and the structure that the fiber optic ferrule engages. The alignment structure 130 is preferably molded with the fiber optic ferrule 100 at the same time and from the same material as the fiber optic ferrule 100. As such, the fiber optic ferrule 100 and the alignment structure 130 are integrally formed. Alternatively, the alignment structure 130 could be attached to the fiber optic ferrule 100 sometime after the fiber optic ferrule is molded. It could be made from the same material and attached in a number of different ways. It could be attached with an adhesive, such as epoxy, or ultrasonically welded to the main body 102. Alternatively, the fiber optic ferrule 100 could be molded as a body with a larger thickness and then the alignment structure 130 is formed by removing some of the fiber optic ferrule material.

Figure 3:
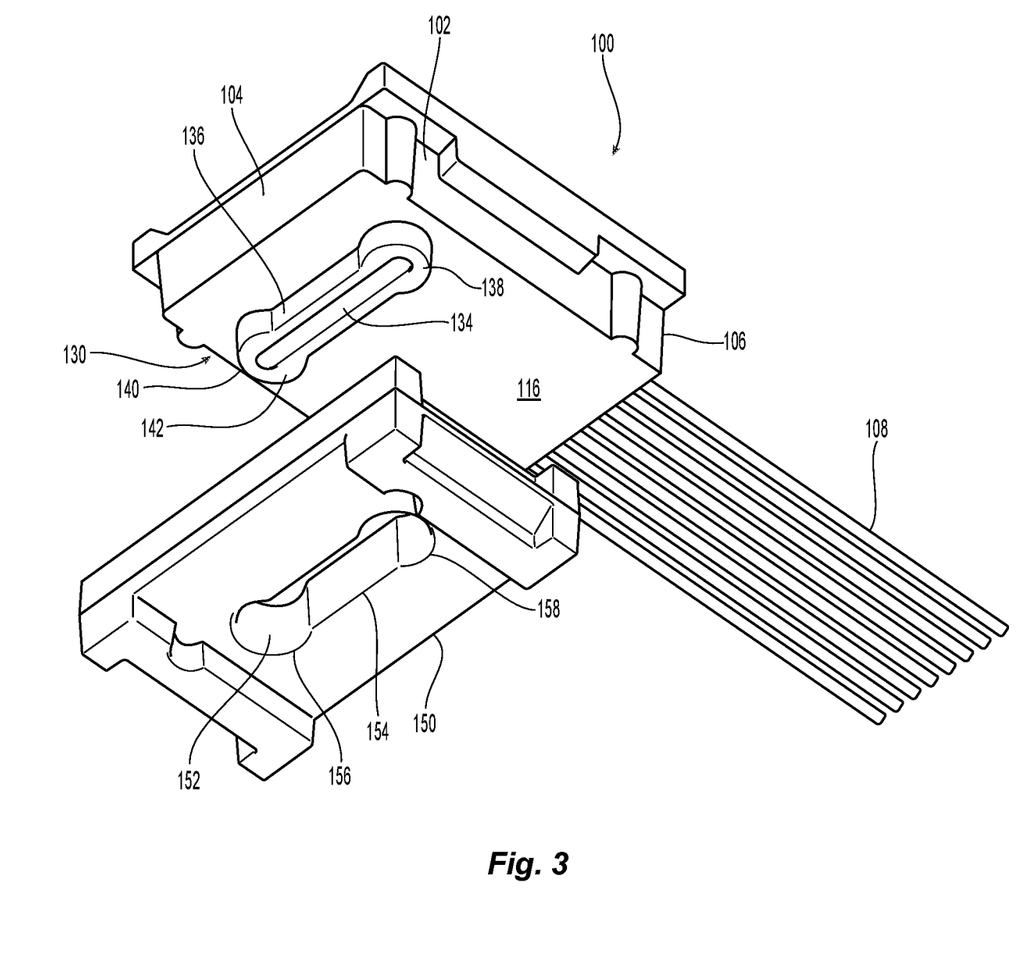
FIG. 3 is a perspective view of the fiber optic ferrule in FIG. 1 from the bottom and in alignment with a receptacle.
Figure 4:
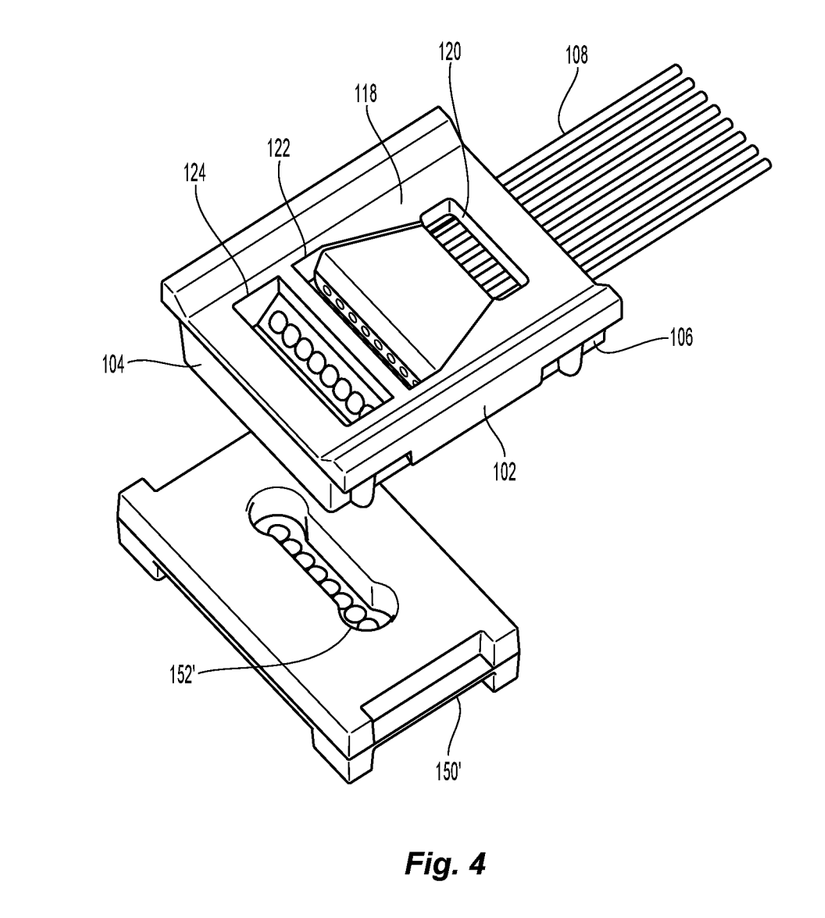
FIG. 4 is a perspective view of the fiber optic ferrule in FIG. 1 from the bottom and in alignment with a receptacle having lenses therein.
Figure 5:
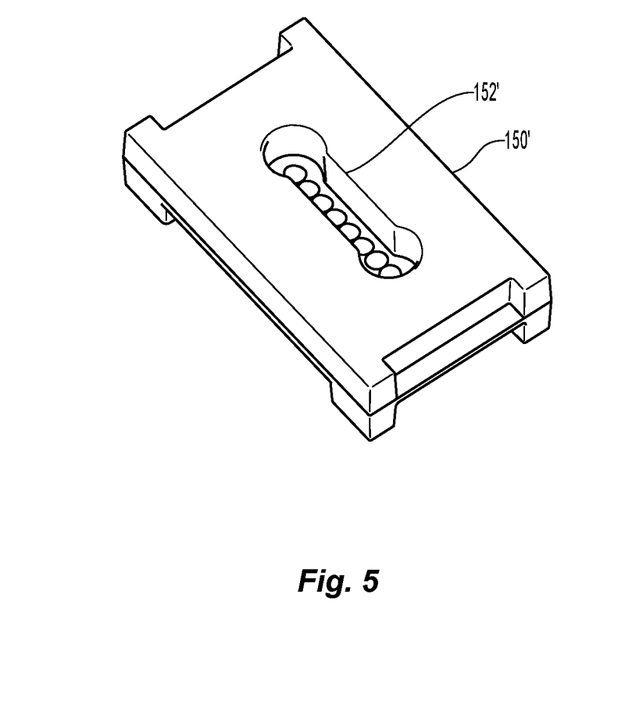
FIG. 5 is a perspective view of the receptacle in FIG. 4.
Figure 6:
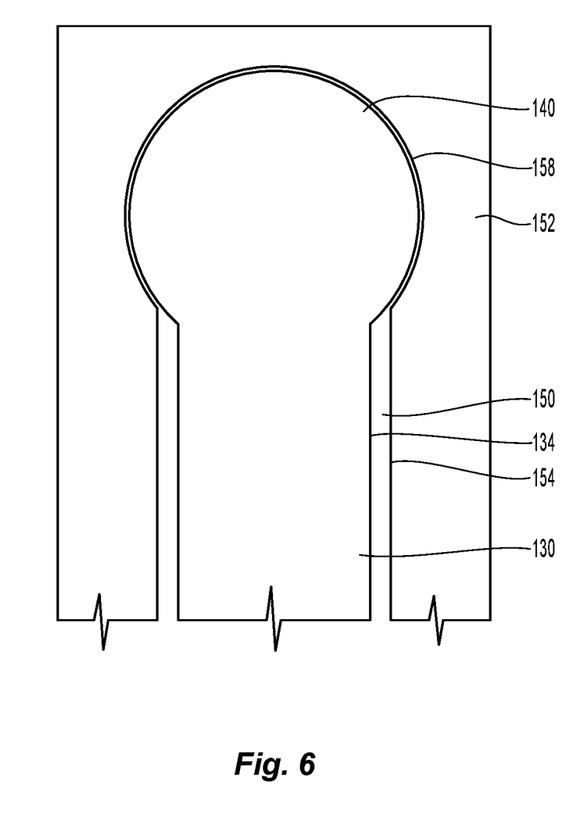
FIG. 6 is a plane view of a portion of the fiber optic ferrule and the receptacle in FIG. 3 showing the fit.
Figure 7:
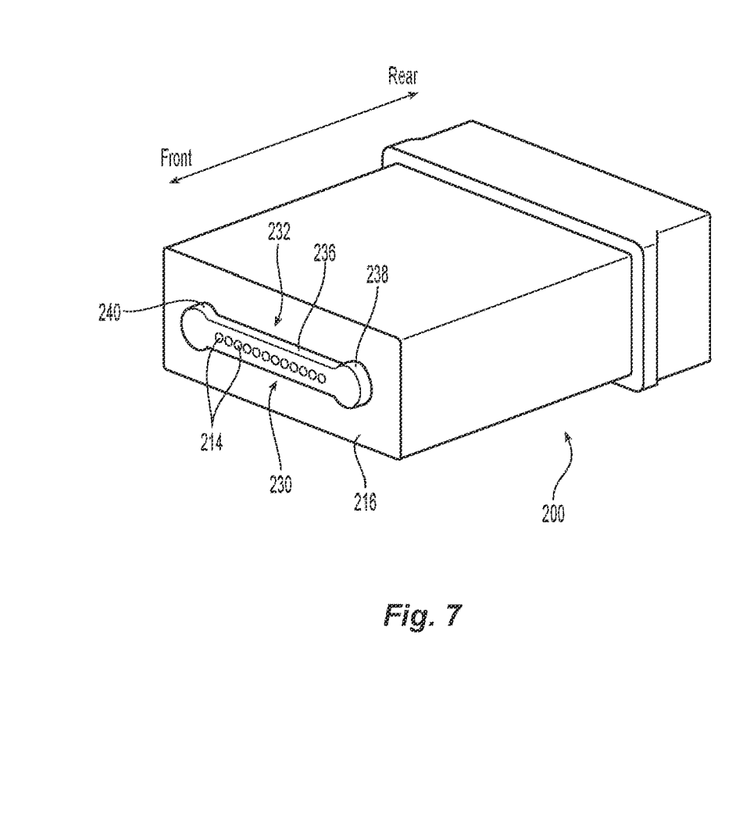
FIG. 7 is a perspective view of a second embodiment of a fiber optic ferrule from the front according to the present invention.

A receptacle 150 for receiving the fiber optic ferrule 100 is illustrated in FIG. 3 and a second receptacle 150' is illustrated in FIGS. 4 and 5. The only difference between the receptacle 150 and the receptacle 150' is that receptacle 150' has a plurality of lenses 154' in the opening 152' that receives the alignment structure 130. So for receptacle 150' with a plurality of lenses 154', there may be no need to have the plurality of lenses in the main body 102. The receptacle 150 (and receptacle 150') is preferably aligned with the transceiver on the board, but those structures are omitted from the drawings to increase clarity.

The fiber optic ferrule 100 with the alignment structure 130 can be aligned with the opening 152. As noted above, the first portion 136 and second portions 138, 140 align the fiber optic ferrule 100 with the receptacle 150 (and receptacle 150'). In particular, the opening 150 has a first portion 154 and second portions 156, 158. However, the opening 150 is sized slightly different from the sizing of the alignment structure 130 and the first portion 136 and second portions 138, 140. The first portion 154 and second portions 156, 158 of opening 150 are slightly larger than the first portion 136 and second portions 138, 140, respectively, but there may also be an interference fit. The difference in the sizes of the second portions is less than the difference in the sizes of the first portions because the second portions are the features that align the fiber optic ferrule 100 to the receptacle 150 (and receptacle 150'). Indeed, it is the curved second portions 156, 158 and 138, 140 that control the alignment of the fiber optic ferrule 100 to the receptacle 150. Again, the exact shape of the opening 150 can be changed to match the configuration of the alignment structure 130 and any changes to that configuration noted above.

Figure 8:
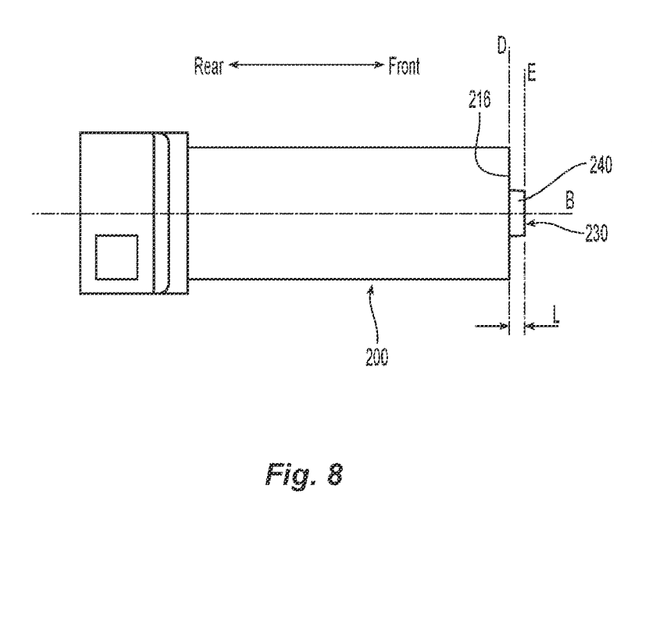
FIG. 8 is a side elevational view of the fiber optic ferrule in FIG. 7.
Figure 9:
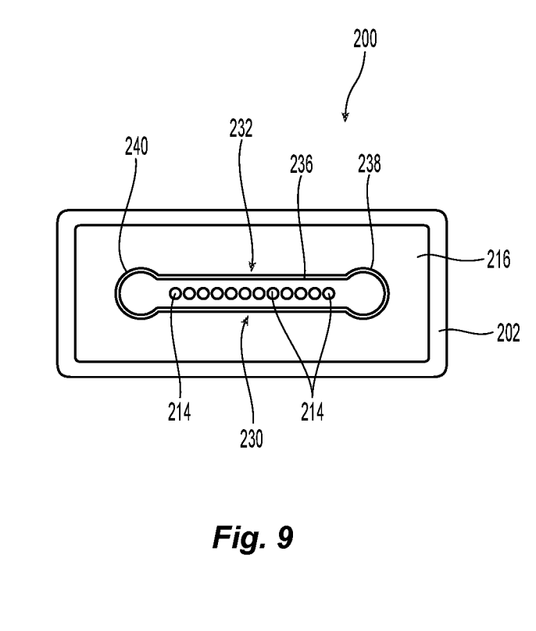
FIG. 9 is a front elevational view of the fiber optic ferrule in FIG. 7.

Turning now to the embodiment in FIGS. 7-12, there is a different embodiment of a fiber optic ferrule 200. Applicant notes that the term "front" or "forward" means that direction where the fiber optic connector would meet with another fiber optic connector or device, while the term "rear" or "rearward" is used to mean the direction from which the optical fibers enter into the fiber-optic ferrule or fiber optic connector. Thus, "front" is that part of the fiber optic ferrule 200 on the left side of FIG. 7 where the alignment structure 230 is located and "forward" is out and to the left. "Rear" is that part of the fiber optic ferrule that is on the right side of the page and "rearward" is toward the right. In FIG. 8, front and forward is to the right, and rear, rearward, and back are on the left side of the fiber optic ferrule 200.

The fiber optic ferrule 200 has a main body 202 that extends between a front end 204 and a rear end 206. A plurality of optical fibers (not shown but the same as optical fibers 108) can be secured within the fiber optic ferrule 200. The optical fibers are inserted into the fiber optic ferrule 200 through a rear opening 210 through the rear end 206. Each of the plurality of optical fibers is inserted into one of a plurality of optical fiber openings 212 in a center portion of the main body 202. See FIG. 12.

The fiber optic ferrule 200 has a front surface 216 through which the light to and from the optical fibers passes. Fiber optic ferrule 200 may have an opening 220 in a top surface 218 for an adhesive/epoxy to hold the plurality of optical fibers within the fiber optic ferrule 200. See FIG. 12. It is the front surface 216 and the alignment structure 230 that will be the focus of the remainder of the discussion as the remainder of the fiber optic ferrule is known.

The alignment structure 230 extends from the front surface 216 and away from the main body 202. In the middle 232 of the alignment structure are a plurality of lenses 214 that are in optical alignment with the plurality of optical fiber openings 212 (and the plurality of optical fibers).

The alignment structure 230 is configured similar to the shape of a dog bone, for the same reasons as noted above. As with the prior embodiment, other configurations are possible.

The alignment structure 230 has a first portion 236 extending between two second portions 238, 240 along the front surface 216. As illustrated, the first portion 236 is generally rectangularly shaped, but could have other configurations as long as the functions of the alignment structure 230 as noted above are satisfied. For example, the first portion 236 could have convex or concave sides rather than the straight ones. The two second portions 238, 240 are illustrated as circular portions that connect with the first portion 236 at the ends thereof. The first portion 236 is preferably as long as the length of the plurality of lenses 214 to allow the light to pass therethrough, but it could be longer or shorter.

Alternatively there could be a transmission window in the alignment structure 230 at the front surface 216 and the plurality of lenses 214 could be recessed or internal in the main body 202.

The second portions 238, 240 are generally circular as illustrated in the figures. The second portions 238, 240 also have a diameter that is about 0.766 mm, and the first portion 236 has a width of about 0.516 mm. It is preferred that the diameter of the second portions 238, 240 is at least 30% larger than the width of the first portion 236. It is generally more preferable that the diameter of the second portions 238, 240 is at least 50% larger than the width of the first portion 236. It should also be noted that the second portions 238, 240 may also have other configurations as long as the functions of the alignment structure 230 as noted below are satisfied. For example, the second portions 238, 240 could be more oval, tear-drop shaped, or two rounded portions separated by a straight portion and still fall within the scope of the present invention. The first portion 236 may also have other features including, for example, a reduced width at the junction with the second portions 238, 240 so the second portions 238, 240 have more of a curved outer edge.

The front surface 116 lies in a first plane D, which is generally perpendicular to a plane B (and a longitudinal axis) in which the plurality of optical fiber openings 212 lie. The alignment structure 230 has a front face 242 that lies in a plane E that is also preferably parallel to plane D and perpendicular to plane B. See FIG. 8.

The alignment structure 230 extends a distance L of about 0.3 mm from the front surface 216 and away from the main body 202. However, the distance that could be greater or less, depending on the need of the user and the structure that the fiber optic ferrule engages. The alignment structure 230 is preferably molded with the fiber optic ferrule 200 at the same time and from the same material as the fiber optic ferrule 200. As such, the fiber optic ferrule 200 and the alignment structure 230 are integrally formed. Alternatively, the alignment structure 230 could be attached to the fiber optic ferrule 200 sometime after the fiber optic ferrule is molded. It could be made from the same material and attached in a number of different ways. It could be attached with an adhesive, such as epoxy, or ultrasonically welded to the main body 202. Alternatively, the fiber optic ferrule 200 could be molded as a body with a larger length and then the alignment structure 230 is formed by removing some of the fiber optic ferrule material.

Figure 10:
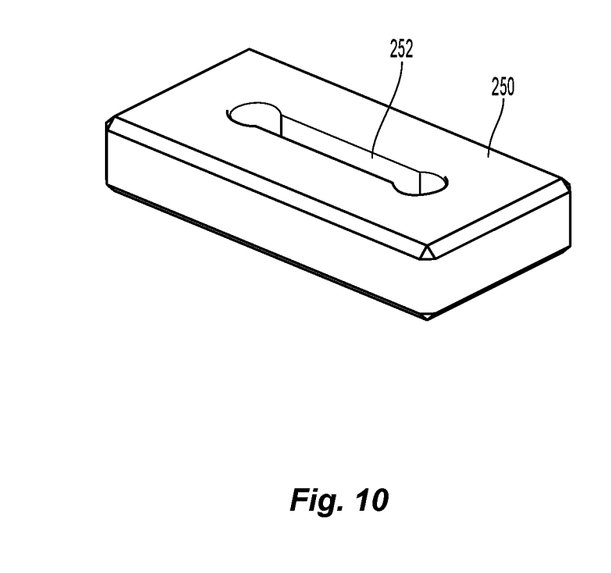
FIG. 10 is a perspective view of one embodiment of a receptacle to be used with the fiber optic ferrule in FIG. 9.
Figure 11:
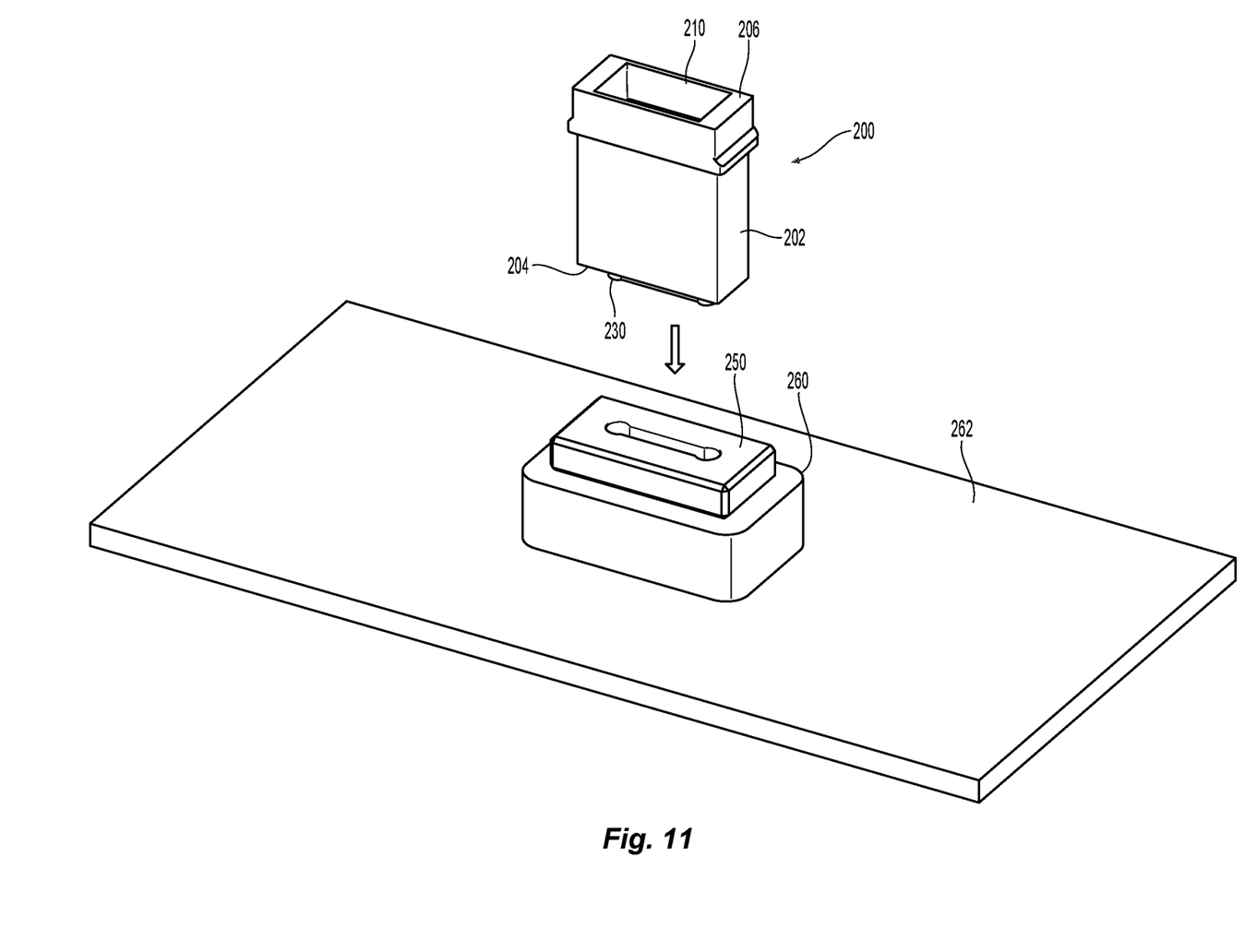
FIG. 11 is a perspective view of the fiber optic ferrule in FIG. 7, the receptacle in FIG. 10, a mechanical-optical interface, and circuit board.

A receptacle 250 with an opening 252 for receiving the fiber optic ferrule 200 is illustrated in FIGS. 10 and 11. The function and design of the receptacle 250 is the same as described above and will not be repeated here. The fiber optic ferrule 200 is illustrated as being inserted into the receptacle 250 in FIG. 11 that also has an MOI 260 and a board 262.

Figure 12:
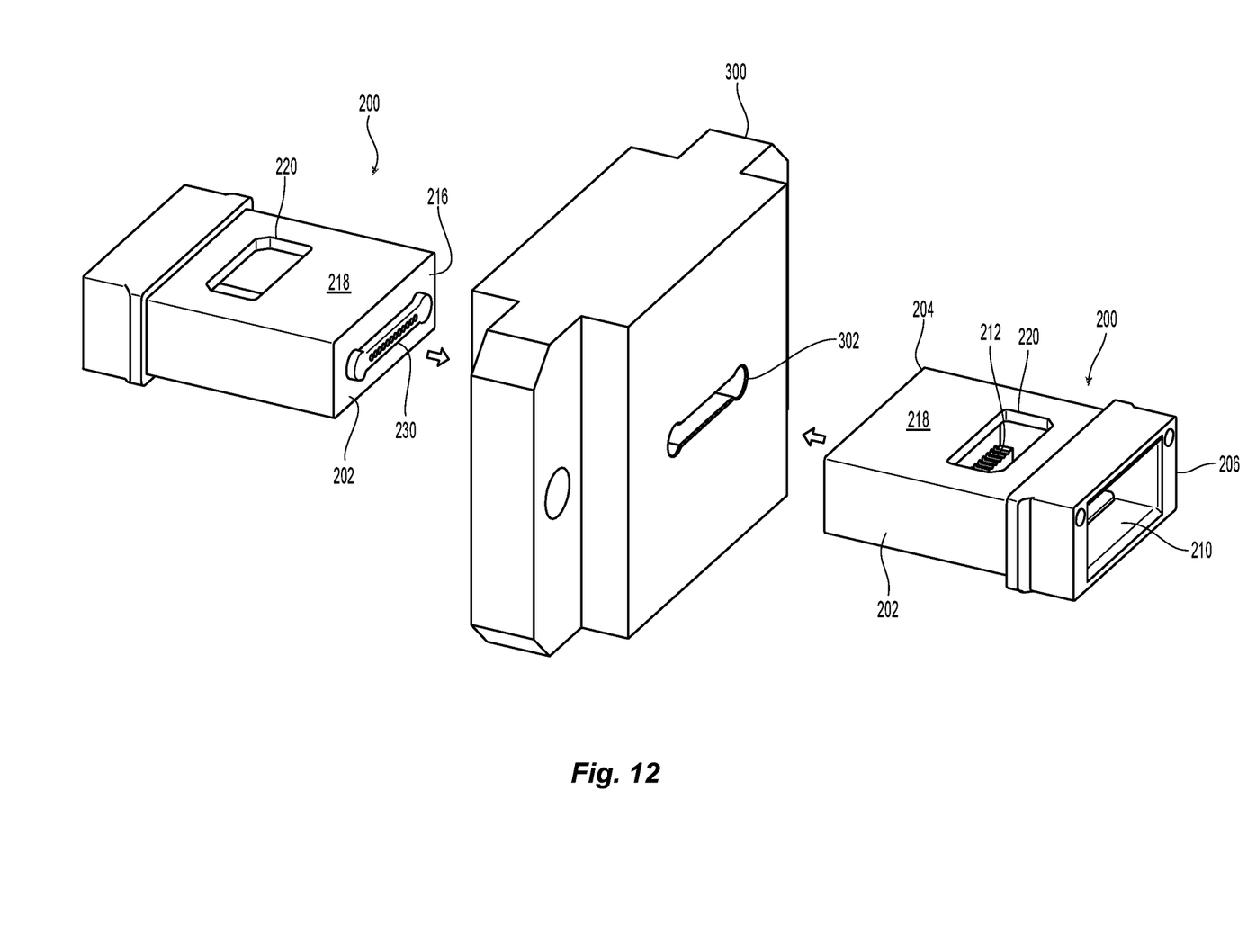
FIG. 12 is a perspective view of two fiber optic ferrules of FIG. 7 and an adapter to align the two fiber optic ferrules.

FIG. 12 illustrates two fiber optic ferrules 200 that will mate in an adapter 300. The adapter 300 has an opening 302 that is the same as openings 150 and 250 to receive the alignment structure 230 on the fiber optic ferrules 200.

Figure 13:
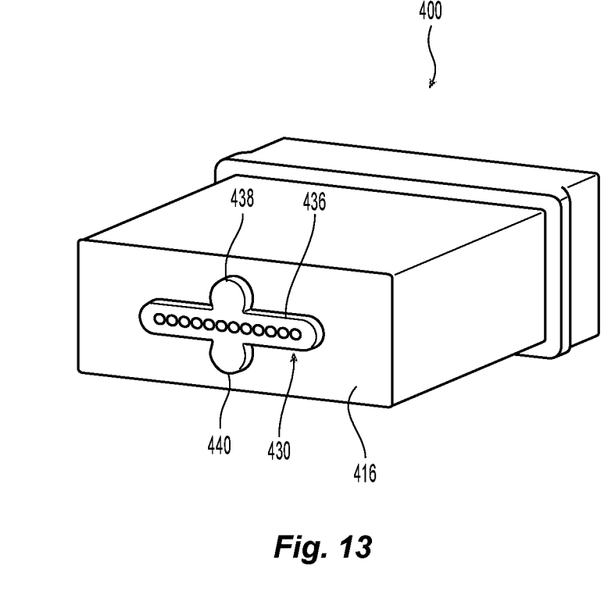
FIG. 13 is a perspective view of another embodiment of a fiber optic ferrule according to the present invention.

Another embodiment of a fiber optic ferrule 400 according to the present invention is illustrated in FIG. 13. The difference between the fiber optic ferrule 400 and the other fiber optic connectors is the shape of the alignment structure 430 on the front face 416. The positioning, forming, and depth of the alignment structure 430 is also the same as noted above. The alignment structure 430 has a first portion 436 extending across the front face 416 and between two second portions 438, 440. The second portions 438, 440 are on opposite sides of the width of the alignment structure 430 rather than the length thereof. This position moves the two second portions 438, 440 closer to the center of the fiber optic ferrule 400 and may further reduce the effect of temperature changes on the alignment of the fiber optic ferrule 400. In a variation of the alignment structure 430, there may be more than one of each of the second portions 438, 440, without departing from the scope of this patent application. For example, on each side of the first portion 436, there may be two circular portions that connect with the first portion 436. Furthermore, the embodiment in FIG. 13 may be combined with the prior embodiments, and dimensions of any portion of the alignment structures 130, 230, 430 may be varied in such a combination to achieve optimum results.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:

1. A fiber optic ferrule comprising:
a main body having a plurality of optical fiber receiving members therein to receive a plurality of optical fibers arranged in at least one row of optical fibers, each of the plurality of optical fiber receiving members configured to receive an optical fiber in the plurality of optical fibers therein, each optical fiber to transport a light beam thereby forming at least one row of light beams;
a surface on the main body optically aligned with the plurality of optical fiber receiving members, ends of the plurality of optical fiber receiving members being separated from the surface; and
an alignment structure molded integrally with the fiber optic ferrule and having a first curved portion and a second curved portion,
wherein the first curved portion is located externally on one side of the main body and the second curved portion is located externally on an opposite side of the main body.

2. The fiber optic ferrule according to claim 1, further comprising a light transmission window, the light transmission window being disposed between the first curved portion and the second curved portion of the alignment structure.

3. The fiber optic ferrule according to claim 1, further comprising a plurality of lenses, each of the plurality of lenses being in optical alignment with one of the plurality of optical fiber receiving members.

4. The fiber optic ferrule according to claim 3, wherein each of the plurality of lenses is disposed between the first curved portion and the second curved portion of the alignment structure.

5. The fiber optic ferrule according to claim 1, wherein the surface lies in a plane that is generally parallel to a longitudinal axis through the plurality of optical fiber receiving members.

6. The fiber optic ferrule according to claim 1, wherein the surface lies in a plane that is generally perpendicular to a longitudinal axis through the plurality of optical fiber receiving members.

7. The fiber optic ferrule according to claim 1, wherein the alignment structure is integrally formed with the main body of the fiber optic ferrule by a removal of ferrule material from the fiber optic ferrule.

8. The fiber optic ferrule according to claim 3, wherein the alignment structure is matingly receivable in a matching structure to position the fiber optic ferrule for mating.

9. The fiber optic ferrule according to claim 1, wherein the at least one row of light beams undergo total internal reflection at the fiber optic ferrule and pass through the surface substantially perpendicular to the plurality of optical fiber receiving members and the at least one row of optical fibers.

10. The fiber optic ferrule according to claim 1, wherein the at least one row of light beams pass through the surface in alignment with the plurality of optical fiber receiving members and the at least one row of optical fibers.

11. The fiber optic ferrule according to claim 1, wherein the fiber optic ferrule is free of guide pins.

12. The fiber optic ferrule according to claim 1, wherein the fiber optic ferrule is a single-piece ferrule.

13. A fiber optic ferrule comprising:
a main body having a plurality of optical fiber receiving members therein to receive a plurality of optical fibers arranged in at least one row of optical fibers, each of the plurality of optical fiber receiving members configured to receive an optical fiber in the plurality of optical fibers therein, each optical fiber to transport a light beam thereby forming at least one row of light beams;
a surface on the main body through which the at least one row of light beams travels outside of the plurality of optical fibers;
a first curved portion for an alignment of the fiber optic ferrule located externally on one side of the main body; and
a second curved portion for an alignment of the fiber optic ferrule located externally on an opposite side of the main body,
wherein the first curved portion and the second curved portion each being molded integrally with the fiber optic ferrule.

14. The fiber optic ferrule according to claim 13, wherein the main body extends along a longitudinal axis and the first curved portion and the second curved portion also extend substantially parallel to the longitudinal axis.

15. The fiber optic ferrule according to claim 13, wherein the first curved portion and the second curved portion extend inward into the main body of the fiber optic ferrule.

16. The fiber optic ferrule according to claim 13, wherein the first curved portion and the second curved portion are integrally formed by a removal of a ferrule material from the fiber optic ferrule, thereby extending inwardly into the main body of the fiber optic ferrule.

17. The fiber optic ferrule according to claim 13, wherein the fiber optic ferrule is a lensed ferrule.

18. The fiber optic ferrule according to claim 13, further comprising a substantially rectangular portion formed between the first curved portion and the second curved portion on the surface through which the at least one row of light beams pass.

19. The fiber optic ferrule according to claim 18, wherein the rectangular portion is also integrally molded with the fiber optic ferrule.

20. A fiber optic ferrule comprising:
a main body having a plurality of optical fiber receiving members therein to receive a plurality of optical fibers arranged in at least one row of optical fibers, each of the plurality of optical fiber receiving members configured to receive an optical fiber in the plurality of optical fibers therein, each optical fiber to transport a light beam thereby forming at least one row of light beams;
a surface on an end face of the main body of the fiber optic ferrule optically aligned with the plurality of optical fiber receiving members, ends of the plurality of optical fiber receiving members being separated from the surface; and
an alignment structure molded integrally with the fiber optic ferrule and having a first curved portion and a second curved portion; and
a generally rectangular portion located between the first curved portion and the second curved portion,
wherein the first curved portion is located on one side of the main body and the second curved portion is located on an opposite side of the main body.

* * * * *